United States Patent
Horst et al.

(10) Patent No.: US 12,246,768 B2
(45) Date of Patent: Mar. 11, 2025

(54) COMPACT COLLAPSIBLE STROLLER

(71) Applicant: Wonderland Switzerland AG, Steinhausen (CH)

(72) Inventors: Andrew J. Horst, West Lawn, PA (US); Daniel A. Sack, Pottstown, PA (US)

(73) Assignee: Wonderland Switzerland AG, Steinhausen (CH)

( * ) Notice: Subject to any disclaimer, the term of this patent is extended or adjusted under 35 U.S.C. 154(b) by 58 days.

(21) Appl. No.: 17/756,454

(22) PCT Filed: Nov. 27, 2020

(86) PCT No.: PCT/IB2020/061216
§ 371 (c)(1),
(2) Date: May 25, 2022

(87) PCT Pub. No.: WO2021/105944
PCT Pub. Date: Jun. 3, 2021

(65) Prior Publication Data
US 2023/0001976 A1    Jan. 5, 2023

Related U.S. Application Data

(60) Provisional application No. 62/941,303, filed on Nov. 27, 2019.

(51) Int. Cl.
*B62B 7/08* (2006.01)
*B62B 7/06* (2006.01)
*B62B 7/14* (2006.01)

(52) U.S. Cl.
CPC .............. *B62B 7/083* (2013.01); *B62B 7/064* (2013.01); *B62B 7/14* (2013.01); *B62B 7/142* (2013.01); *B62B 7/147* (2013.01)

(58) Field of Classification Search
CPC ........... B62B 7/08; B62B 7/064; B62B 7/083; B62B 7/062; B62B 7/142; B62B 2205/20; B62B 2205/22
See application file for complete search history.

(56) References Cited

U.S. PATENT DOCUMENTS

| 3,459,435 A | 8/1969 | Garner |
|---|---|---|
| 3,556,546 A | 1/1971 | Garner |

(Continued)

FOREIGN PATENT DOCUMENTS

| CN | 201769848 U | 3/2011 |
|---|---|---|
| CN | 103269936 A | 8/2013 |

(Continued)

OTHER PUBLICATIONS

EP Office Action dated Jun. 19, 2023 from the related EP Patent Application No. 20 841 758.4.

(Continued)

*Primary Examiner* — Emma K Frick
(74) *Attorney, Agent, or Firm* — Fay Kaplun & Marcin, LLP

(57) ABSTRACT

A compact collapsible stroller includes a main stroller frame. The main stroller frame includes a central frame hub, and a handle portion, a rear leg portion and a front leg portion that can separately be pivotally coupled to the central frame hub. The main stroller frame further includes an adapter portion attached to the handle portion. The stroller has an unfolded state for use and a folded state for storage. When the stroller changes from the unfolded state to the folded state, the adapter portion approaches a rear wheel set. The main stroller frame can be compactly folded using a series of pivot points, which may accept child seats of various configurations during installation. The seat can be folded in a manner suitable to the folding boundary size of (Continued)

the main stroller frame, thereby keeping the folding size of the stroller unit minimal.

16 Claims, 22 Drawing Sheets

(56) References Cited

U.S. PATENT DOCUMENTS

| | | | |
|---|---|---|---|
| 3,873,116 A | 3/1975 | Perego | |
| 6,523,853 B1 | 2/2003 | Cheng | |
| 7,255,206 B1 | 8/2007 | Hackbarth et al. | |
| 7,267,359 B1* | 9/2007 | Yang | B62B 7/142 |
| | | | 280/47.38 |
| 7,338,127 B2 | 3/2008 | Church | B62B 9/102 |
| | | | 297/118 |
| 7,377,537 B2 | 5/2008 | Li | |
| 7,413,213 B2* | 8/2008 | Pike | B62B 9/26 |
| | | | 280/47.38 |
| 8,087,689 B2 | 1/2012 | Fritz et al. | |
| 8,322,744 B2 | 12/2012 | Ahnert et al. | |
| 8,474,854 B2 | 7/2013 | Dean et al. | |
| 8,596,669 B2* | 12/2013 | Liao | B62B 7/08 |
| | | | 280/47.38 |
| 8,657,326 B2* | 2/2014 | Shaanan | B62B 9/102 |
| | | | 280/47.38 |
| 8,672,341 B2* | 3/2014 | Offord | B62B 7/08 |
| | | | 280/47.38 |
| 8,714,581 B2 | 5/2014 | Fritz et al. | |
| 8,764,048 B1 | 7/2014 | Ahnert et al. | |
| 9,010,773 B2* | 4/2015 | Horst | B62B 7/145 |
| | | | 280/47.38 |
| 9,050,993 B2 | 6/2015 | Pollack | |
| 9,085,312 B2 | 6/2015 | Liu | |
| 9,108,659 B2* | 8/2015 | Sparling | B62B 7/142 |
| 9,193,373 B2 | 11/2015 | Fjelland et al. | |
| 9,221,487 B2* | 12/2015 | Doucette | B62B 7/123 |
| 9,260,128 B2* | 2/2016 | Liu | B62B 7/08 |
| 9,399,477 B2 | 7/2016 | Iftinca et al. | |
| 9,517,786 B2* | 12/2016 | Chang | B62B 7/062 |
| 9,517,787 B2* | 12/2016 | Zehfuss | B62B 7/062 |
| 9,545,940 B2* | 1/2017 | Taylor | B62B 7/142 |
| 9,610,966 B2* | 4/2017 | Zhong | B62B 7/142 |
| 9,796,405 B2* | 10/2017 | Li | B62B 7/062 |
| 9,962,011 B1 | 5/2018 | Eyman | |
| 10,000,226 B2* | 6/2018 | Yi | B62B 7/062 |
| 10,144,442 B2* | 12/2018 | Ransil | B62B 7/062 |
| 10,239,550 B2* | 3/2019 | Ruggiero | B62B 7/105 |
| 10,293,843 B2* | 5/2019 | Naslain | B62B 9/104 |
| 10,442,453 B2* | 10/2019 | Haut | B62B 7/062 |
| 10,479,390 B2* | 11/2019 | Zhong | B62B 7/08 |
| 10,766,517 B2* | 9/2020 | Cheng | B62B 9/26 |
| 10,787,188 B2 | 9/2020 | Popp | |
| 10,858,030 B2* | 12/2020 | Horst | B62B 9/142 |
| 10,882,546 B2 | 1/2021 | Wang et al. | |
| 10,913,481 B2 | 2/2021 | Kim | |
| 11,021,183 B2* | 6/2021 | Ma | B62B 7/083 |
| 11,203,371 B2* | 12/2021 | Zhong | B62B 7/068 |
| 11,208,136 B2* | 12/2021 | Taylor | B60N 2/2848 |
| 11,225,279 B2* | 1/2022 | Horst | B62B 7/145 |
| 11,247,710 B2* | 2/2022 | Yi | B62B 7/08 |
| 11,358,623 B2* | 6/2022 | Zhong | B62B 7/064 |
| 2006/0082104 A1 | 4/2006 | Wun | |
| 2007/0164538 A1 | 7/2007 | Yeh | |
| 2008/0079240 A1 | 4/2008 | Yeh | |
| 2010/0025968 A1 | 2/2010 | Fritz et al. | |
| 2010/0308550 A1 | 12/2010 | Li et al. | |
| 2013/0113185 A1* | 5/2013 | Zehfuss | B62B 3/02 |
| | | | 280/647 |
| 2013/0113188 A1 | 5/2013 | Liao | |
| 2014/0191483 A1 | 7/2014 | Rolicki et al. | |
| 2014/0334867 A1 | 11/2014 | Su et al. | |
| 2015/0048599 A1 | 2/2015 | Liu | |
| 2015/0151774 A1 | 6/2015 | Liu | |
| 2015/0183450 A1 | 7/2015 | Chen | |
| 2015/0197270 A1 | 7/2015 | Sundberg et al. | |
| 2015/0291200 A1 | 10/2015 | Taylor et al. | |
| 2016/0101802 A1* | 4/2016 | Zhong | A47D 11/005 |
| | | | 280/47.4 |
| 2017/0144687 A1 | 5/2017 | Li et al. | |
| 2017/0217471 A1 | 8/2017 | Haut et al. | |
| 2017/0297599 A1* | 10/2017 | Zhong | B62B 7/142 |
| 2017/0313337 A1 | 11/2017 | Horst | |
| 2018/0162437 A1* | 6/2018 | Mostert | B62B 9/102 |
| 2019/0217879 A1* | 7/2019 | Gibson | B62B 7/008 |
| 2019/0351929 A1 | 11/2019 | Williams et al. | |
| 2020/0172142 A1 | 6/2020 | Young et al. | |
| 2020/0239058 A1 | 7/2020 | Zhang | |
| 2020/0353967 A1 | 11/2020 | Horst et al. | |
| 2021/0094601 A1 | 4/2021 | Wu | |
| 2021/0114649 A1 | 4/2021 | Yuan | |
| 2021/0129886 A1 | 5/2021 | Zehfuss | |
| 2023/0001976 A1 | 1/2023 | Horst et al. | |
| 2023/0078130 A1* | 3/2023 | Longenecker | B62B 9/12 |
| | | | 280/650 |
| 2023/0219612 A1* | 7/2023 | Horst | B62B 9/102 |
| | | | 280/39 |

FOREIGN PATENT DOCUMENTS

| | | |
|---|---|---|
| CN | 203558113 U | 4/2014 |
| CN | 105539557 A | 5/2016 |
| CN | 106184331 A | 12/2016 |
| CN | 206384007 U | 8/2017 |
| CN | 107380241 A | 11/2017 |
| CN | 206885123 U | 1/2018 |
| CN | 207360393 U | 5/2018 |
| CN | 106741091 B | 4/2019 |
| CN | 209079968 U | 7/2019 |
| CN | 209535175 U | 10/2019 |
| CN | 116101353 A | 5/2023 |
| DE | 20 2006 012 430 U1 | 10/2006 |
| DE | 10 2016 120455 A1 | 5/2017 |
| DE | 10 2017 109236 A1 | 11/2017 |
| EP | 1 735 200 A2 | 12/2006 |
| EP | 1 735 200 B1 | 1/2011 |
| EP | 2 611 670 A1 | 7/2013 |
| EP | 3 484 758 A1 | 5/2019 |
| EP | 2 611 670 B1 | 4/2020 |
| GB | 2496225 A | 5/2013 |
| JP | 2015-224023 | 12/2015 |
| JP | 2018-008697 | 1/2018 |
| TW | 201028317 A | 8/2010 |
| TW | 201429773 A | 8/2014 |
| WO | 2005/100125 | 10/2005 |
| WO | 2012/027795 A1 | 3/2012 |
| WO | 2018/009971 A1 | 1/2018 |

OTHER PUBLICATIONS

EP Office Action dated Jul. 27, 2023 from the related EP Patent Application No. 20 839 141.7.
Notice of Allowance dated Sep. 10, 2021 from the related U.S. Appl. No. 16/869,604, 17 sheets.
Notice of Allowance dated Nov. 8, 2023 from the related U.S. Appl. No. 17/806,202, 29 sheets.
CA Office Action dated Oct. 16, 2023 from the related CA Patent Appln. Serial No. 3,154,263, 7 sheets.
JP Office Action dated Jun. 12, 2023 along with the English translation from the related JP Patent Appln. Serial No. 2022-529890, 14 sheets.
CN 1$^{st}$ Office Action dated Feb. 25, 2022 along with the English translation from the related CN Patent Appln. Serial No. 202010387208. 9, 21 sheets.
CN 2$^{nd}$ Office Action dated Aug. 16, 2022 along with the English translation from the related CN Patent Appln. Serial No. 202010387208. 9, 18 sheets.
CN 1$^{st}$ Office Action dated Apr. 6, 2022 along with the English translation from the related CN Patent Appln. Serial No. 202010383657. 6, 19 sheets.

(56) References Cited

OTHER PUBLICATIONS

Notice of Allowance dated Aug. 20, 2024 from the U.S. Appl. No. 17/756,575, 22 sheets.

* cited by examiner

COMPACT COLLAPSIBLE STROLLER

Priority Claim

The present application is a National Phase application of PCT Application Serial No. PCT/IB2020/061216 filed Nov. 27, 2020; which claims priority to U.S. Provisional Application Ser. No. 62/941,303 filed Nov. 27, 2019. The disclosure of the above patent(s)/application(s) is incorporated herein by reference.

FIELD OF THE INVENTION

The present disclosure generally relates to a stroller used to transport children while the caregiver is walking outside of the home. More particularly, the invention relates to a stroller capable of folding to a compact size while still allowing for multiple seating modes for the child.

BACKGROUND OF THE INVENTION

There are several strollers in the market that allow the child seat to be attached to the main stroller frame in multiple configurations, as well as strollers that are able to fold to a compact and easily transported size. Currently strollers that offer multiple seating modes for the child do not fold to a compact size that is easy to transport. Furthermore, stroller that are able to fold to a compact size, often do not have full features on the child seat or the main stroller frame, in addition to small wheels that do not allow the stroller to handle uneven terrain.

SUMMARY OF THE INVENTION

The present disclosure relates to a compact collapsible stroller, which can reduce or eliminate at least one of the above-mentioned disadvantages.

This disclosure features a main stroller frame and a child seat that can be attached to the main stroller frame in multiple configurations.

It is a feature of this disclosure that the stroller is folded in two steps because the child seat folds separately from the main stroller frame.

It is a feature of this disclosure that as part of the seat fold, the seat frame is released to pivot around the seat mount so that both the upper and lower seat frames hang relatively vertical with respect to the seat mount.

In order to achieve the above objects of the present disclosure, in one aspect, the present disclosure provides a compact collapsible stroller including a main stroller frame. The main stroller frame includes a central frame hub and a handle portion, a rear leg portion, and a front leg portion pivotally coupled to the central frame hub. The main stroller frame further includes an adapter portion attached to the handle portion. The compact collapsible stroller has an unfolded state for use and a folded state for storage, and the adapter portion approaches rear wheels when the compact collapsible stroller is transformed from the unfolded state to the folded state.

BRIEF DESCRIPTION OF THE DRAWINGS

Various objects, features and advantages of the present disclosure will become more apparent from the detailed descriptions of exemplary embodiments of the present disclosure with reference with the accompanying drawings. The drawings are merely schematic illustrations of the present disclosure and are not necessarily drawn to scale. In the drawings, the same reference numerals refer to the same or similar components throughout the present disclosure.

Figure 1:
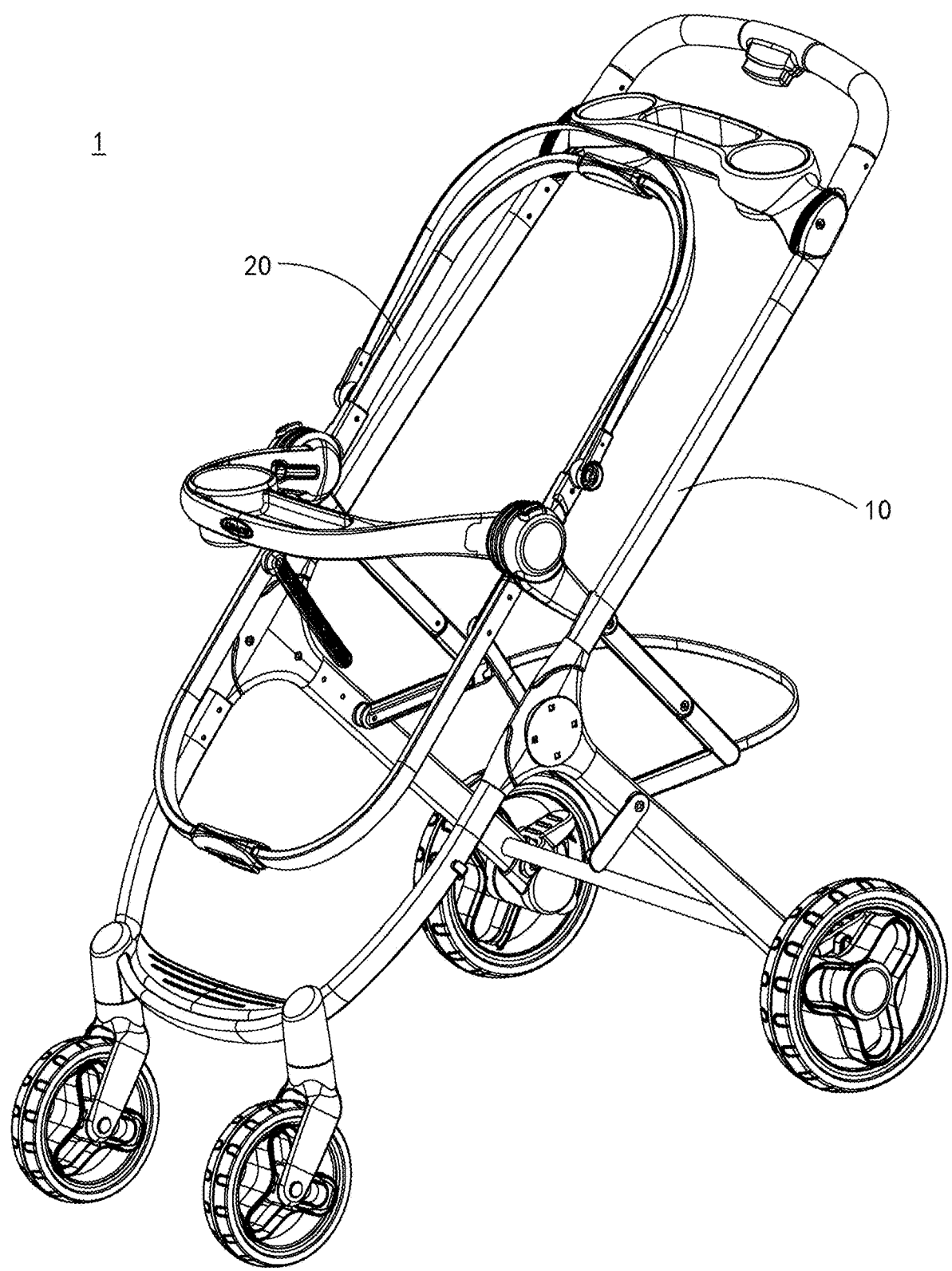
FIG. 1 is a perspective view of the compact collapsible stroller of the present disclosure.

LIST OF REFERENCE SIGNS compact collapsible stroller 1
main stroller frame 10
handle portion 110
handle portion plate 111
spring biased plunger 112
upper handle portion 113
handle portion hub 114
circular barrel 1141
lower handle portion 115
pivot point 1151
upper link 116
lower link 117
rear leg portion 120
rear leg portion plate 121
locking pin 1211
pivot point 122
front leg portion 130
front leg portion plate 131
central frame hub 140
frame latch 150
extended latching surface 151
link 160
adapter portion 170
rear wheels 180
carrying basket 190
child seat frame 20
upper frame 210
upper seat frame hub 211
ramped surface 2111
spiral control surface 2112
upper frame plunger 212
fold handle 213
lower frame 220
lower seat frame hub 221
lower frame plunger 222
lower frame plunger control post 2221
recline handle 223
child tray 230
child tray hub 231
seat mount 240
latch pin assembly 250
ramped surface 251

DETAILED DESCRIPTION OF THE INVENTION

In order to further illustrate the principle and structure of the present disclosure, the preferred embodiments of the present disclosure will be described in detail with reference to the accompanying drawings. However, the embodiments are only provided for illustration and explanation and cannot be used to limit the scope of patent protection of the present disclosure.

The terms used in the present disclosure are only for the purpose of describing specific embodiments and are not intended to limit the present disclosure. The singular forms of "a", "said" and "the" used in the present disclosure and the appended claims are also intended to include plural forms, unless the context clearly indicates other meanings. It should also be understood that the term "and/or" used herein refers to and includes any or all possible combinations of one or more associated listed items.

The compact collapsible stroller (hereinafter referred to as "stroller") 1 of the present disclosure includes a collapsible main stroller frame 10, which can accommodate child seat frames 20 of various configurations (as shown in FIG. 1).

Figure 2:
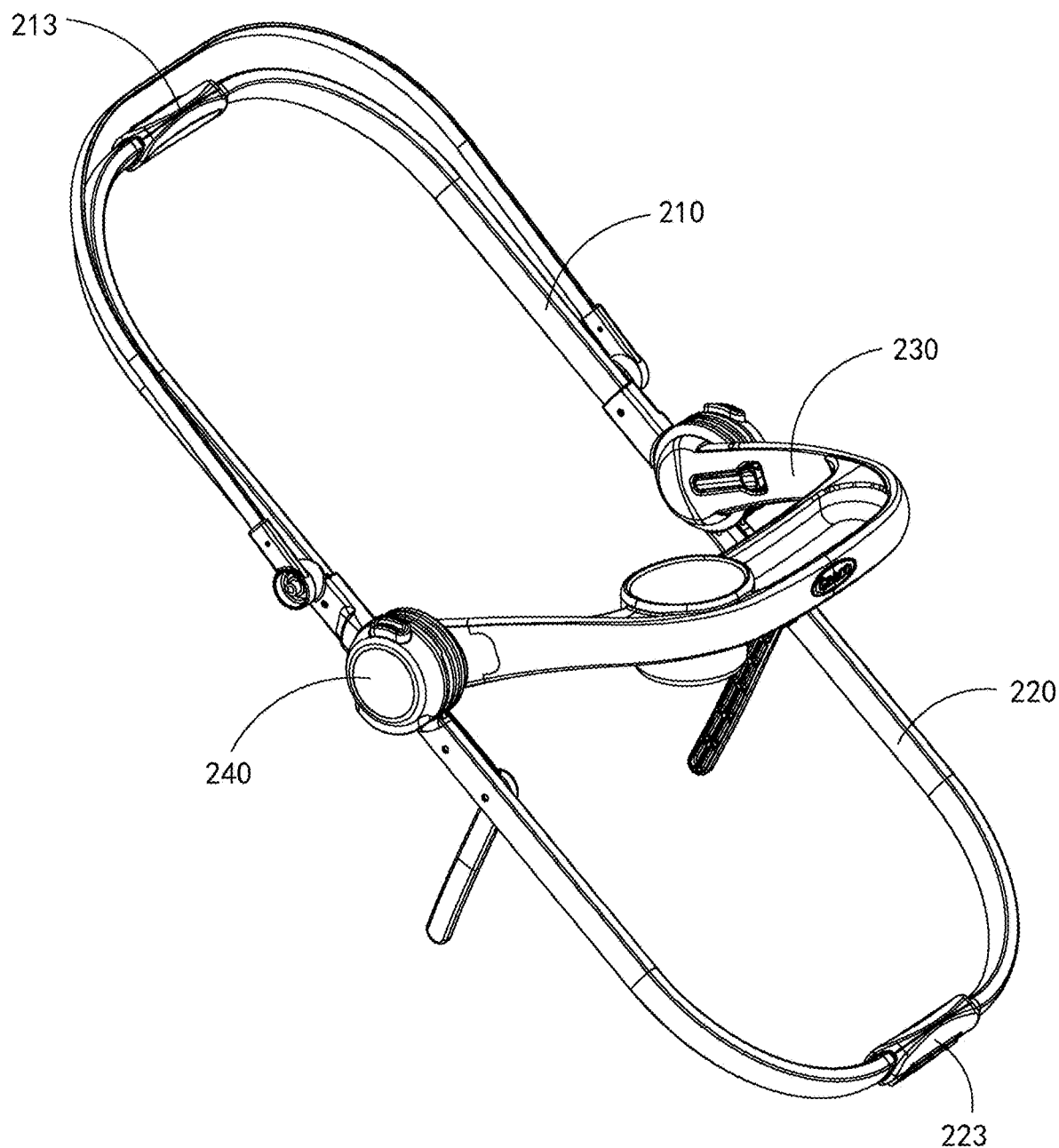
FIG. 2 is a perspective view of the child seat frame of the compact collapsible stroller of the present disclosure.
Figure 3:
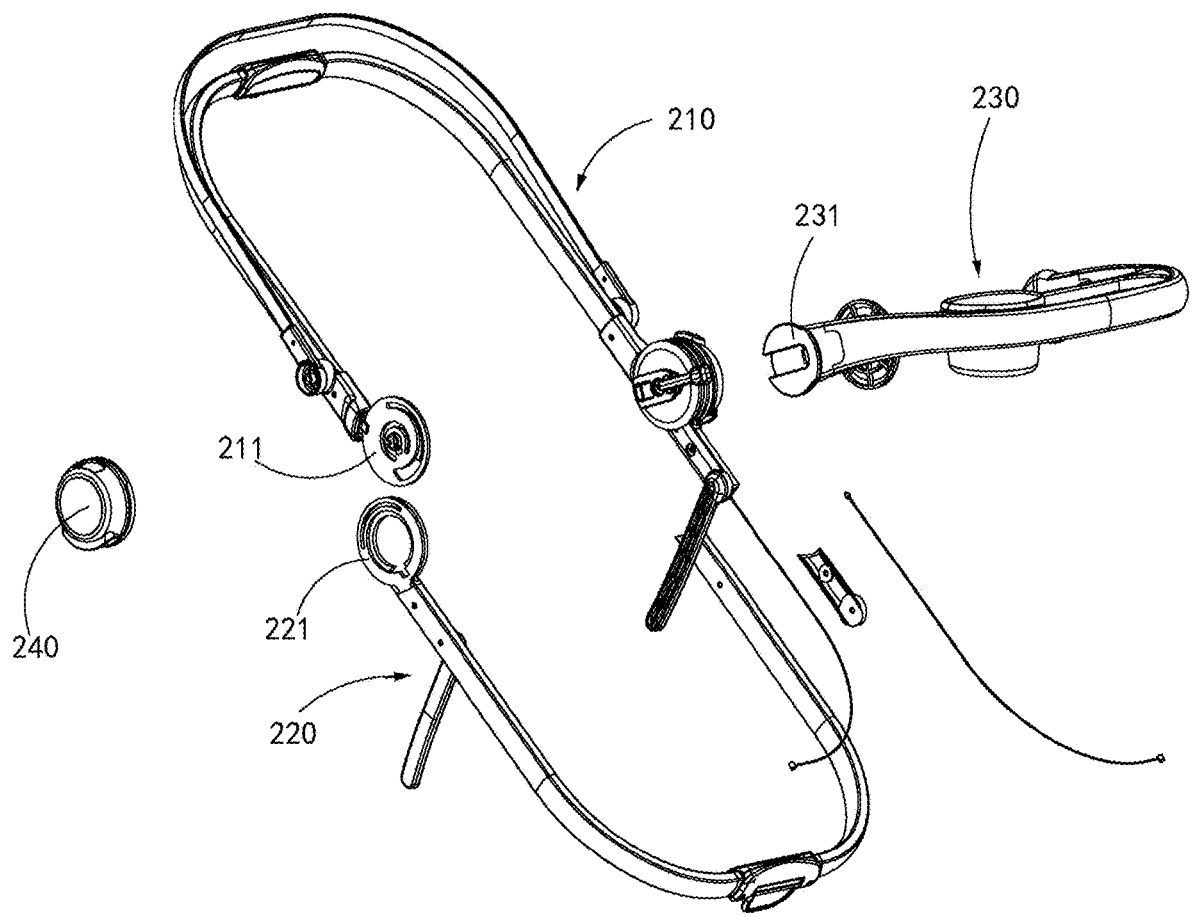
FIG. 3 is a perspective exploded view of the child seat frame of the compact collapsible stroller of the present disclosure.
Figure 3A:
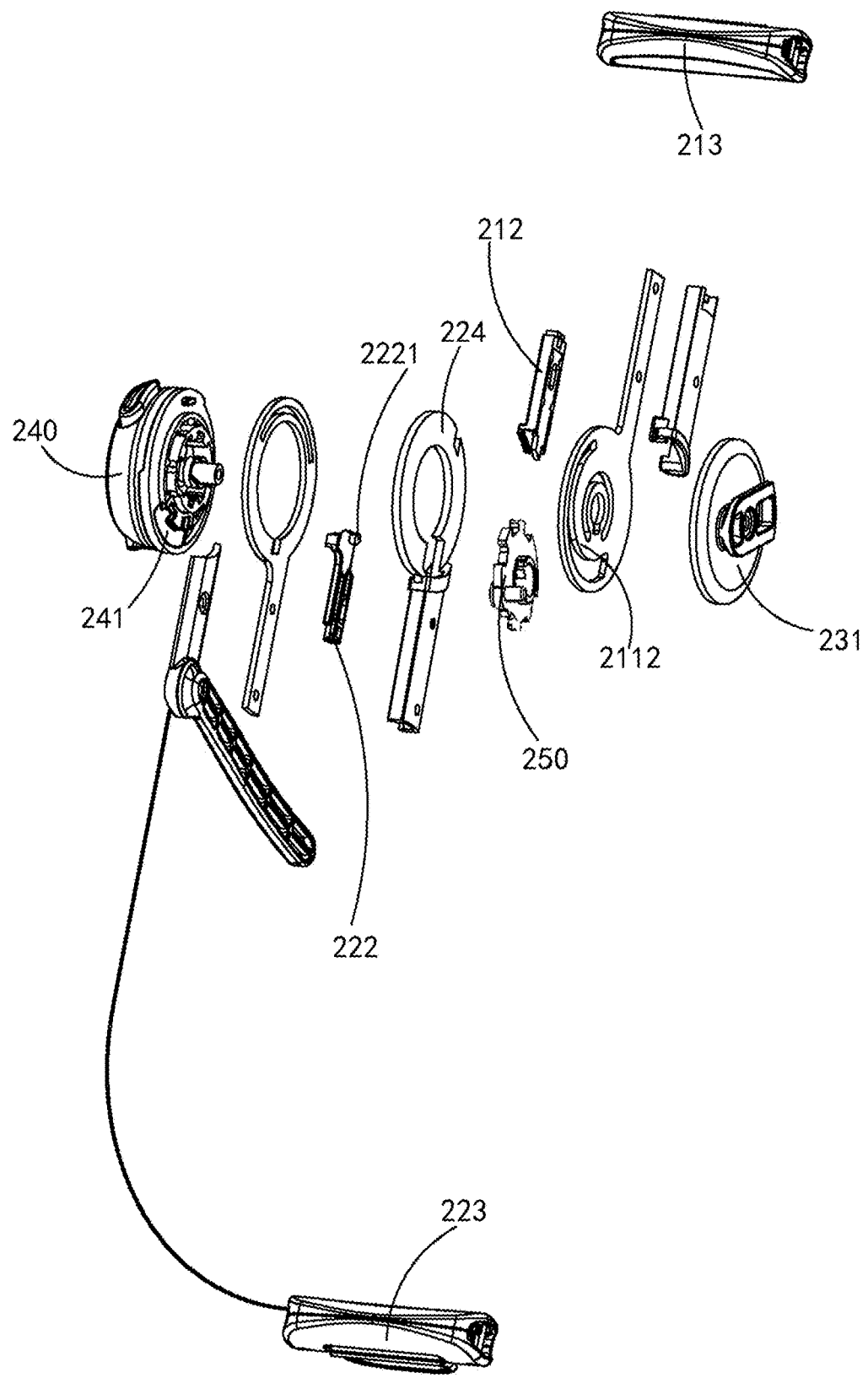
FIG. 3A is a perspective exploded view of some parts of the child seat frame of the compact collapsible stroller of the present disclosure.

One configuration of the child seat frame 20 may include an upper frame 210, a lower frame 220, a child tray 230, and a seat mount 240 (as shown in FIG. 2). The upper frame 210 and the lower frame 220 are pivotally connected to the seat mount 240 through an upper seat frame hub 211 and a lower seat frame hub 221. Likewise, as shown in FIGS. 3 and 3A, the child tray 230 is pivotally connected to the seat hub (seat mount) 240 through a child tray hub 231.

Figure 4:
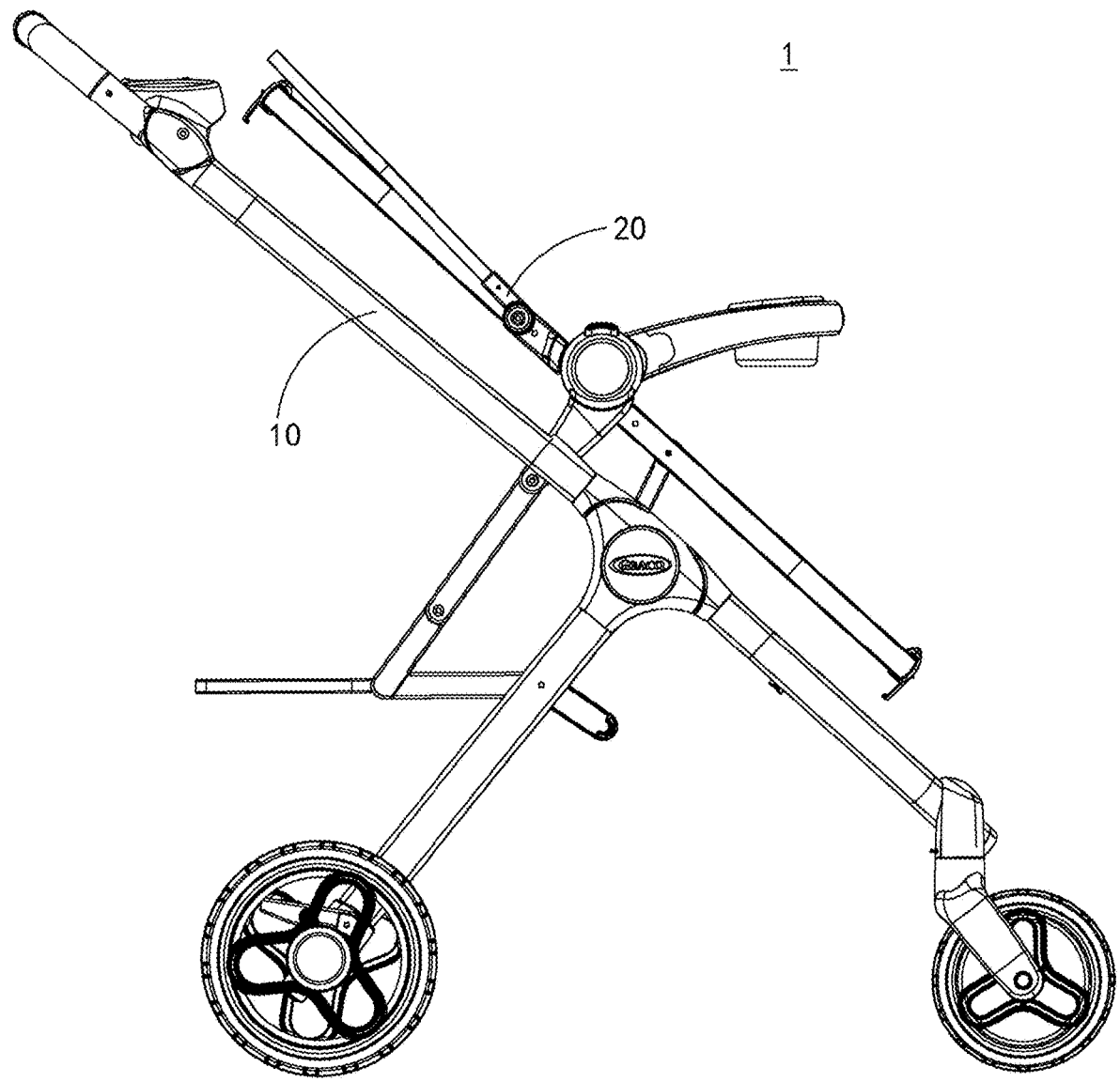
FIG. 4 is a side view of the compact collapsible stroller of the present disclosure, in which the child seat frame is in the seat mode.
Figure 4A:
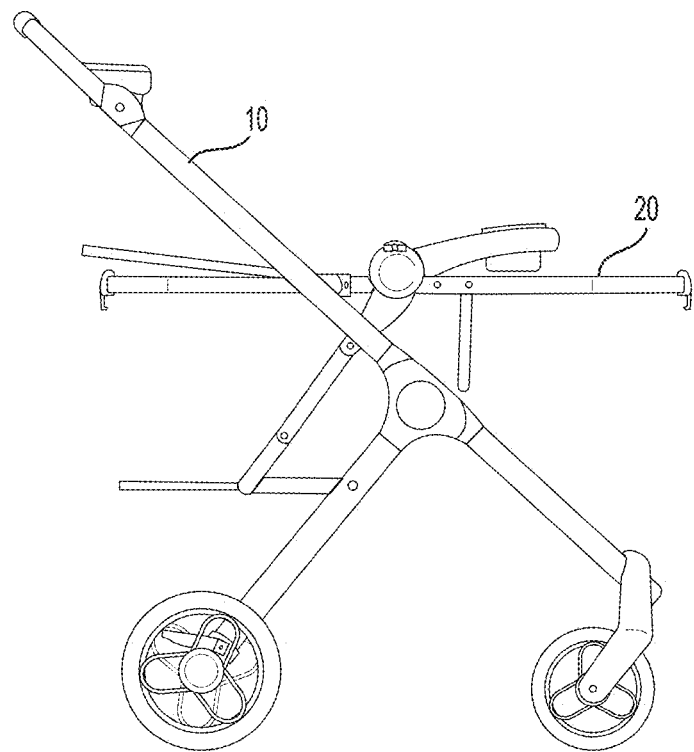
FIG. 4A is a side view of the compact collapsible stroller of the present disclosure, in which the child seat frame is in the cradle mode.

Referring to FIGS. 4 and 4A, the child seat frame 20 may have a seat mode and a cradle mode. One configuration for attaching the child seat frame 20 to the main stroller frame 10 is in a forward sitting position, which is the seat mode. In the seat mode, the upper frame 210 may extend upward from the seat mount 240, specifically, obliquely extending backward and upward, and the lower frame 220 may extend downward from the seat mount 240, specifically, obliquely extending forward and downward. At this time, the upper frame 210 and the lower frame 220 are formed in a linear shape passing through the seat mount 240. In the cradle mode, the upper frame 210 and the lower frame 220 extend horizontally from the seat mount 240 to both sides thereof. The child seat frame 20 can be converted from the position shown in FIG. 4 to a position where the cradle is lying down.

Figure 5:
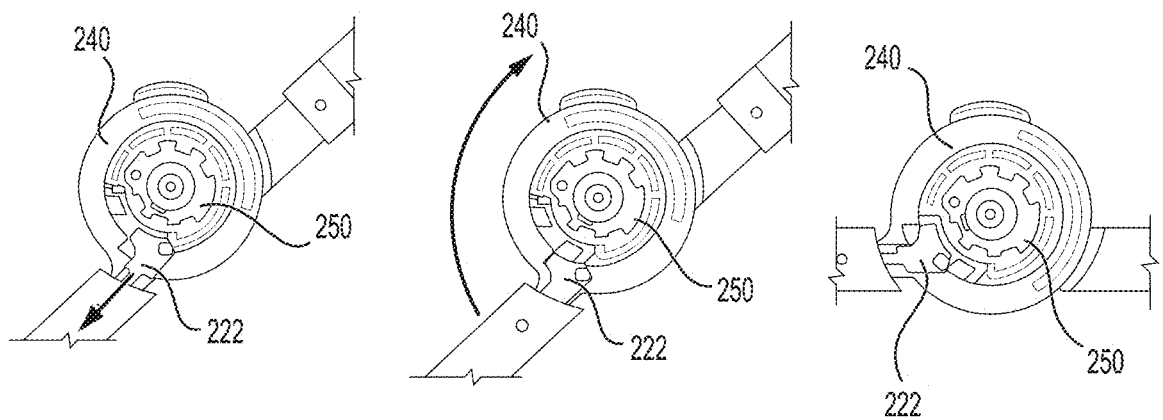
FIG. 5 is a partial view of different modes of the child seat frame of the compact collapsible stroller of the present disclosure.

Referring to FIG. 5, in order to convert the child seat frame 20 from the seat mode to the cradle position (i.e., cradle mode), the user may manipulate the recline handle 223, which uses a cable to retract the spring-loaded lower frame plunger 222 from a position engaging with the seat mount 240. This allows the entire child seat frame 20 to rotate to a horizontal position relative to the seat mount 240, and re-engages the spring-loaded lower frame plunger 222 with the seat mount 240 to lock the child seat frame 20 in this position.

Figure 6:
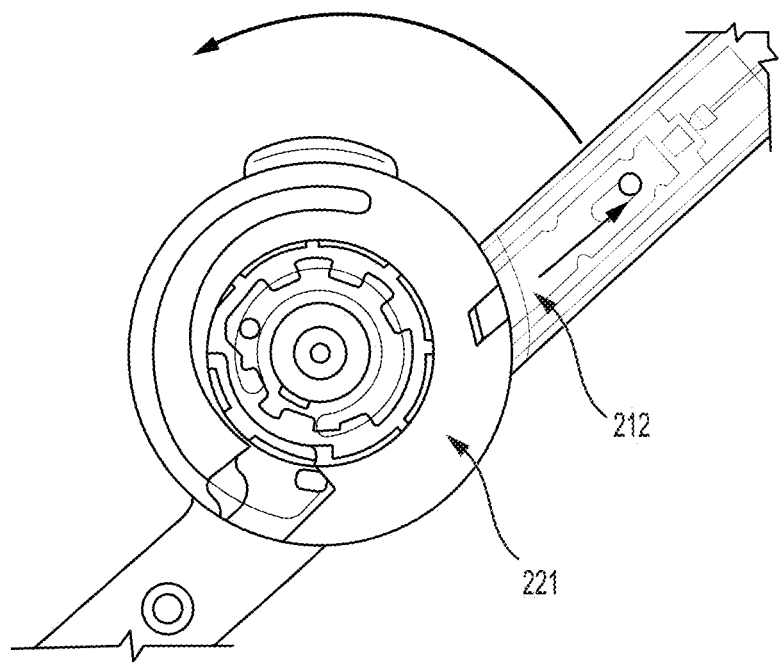
FIG. 6 is a partial view of the child seat frame of the compact collapsible stroller in the seat mode of the present disclosure.
Figure 7:
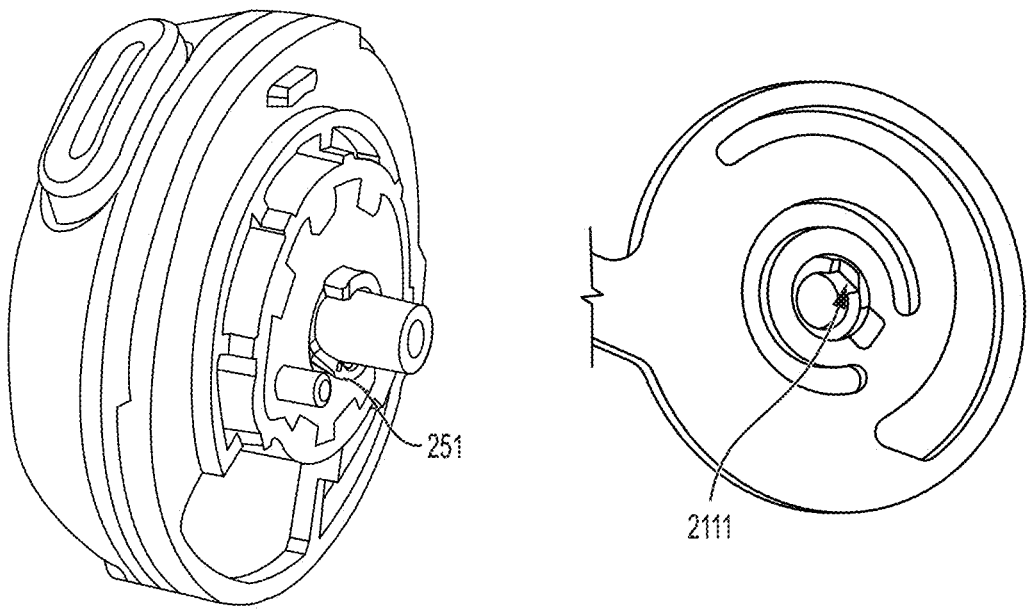
FIG. 7 is a perspective exploded view of some parts of the child seat frame of the compact collapsible stroller of the present disclosure.
Figure 8:
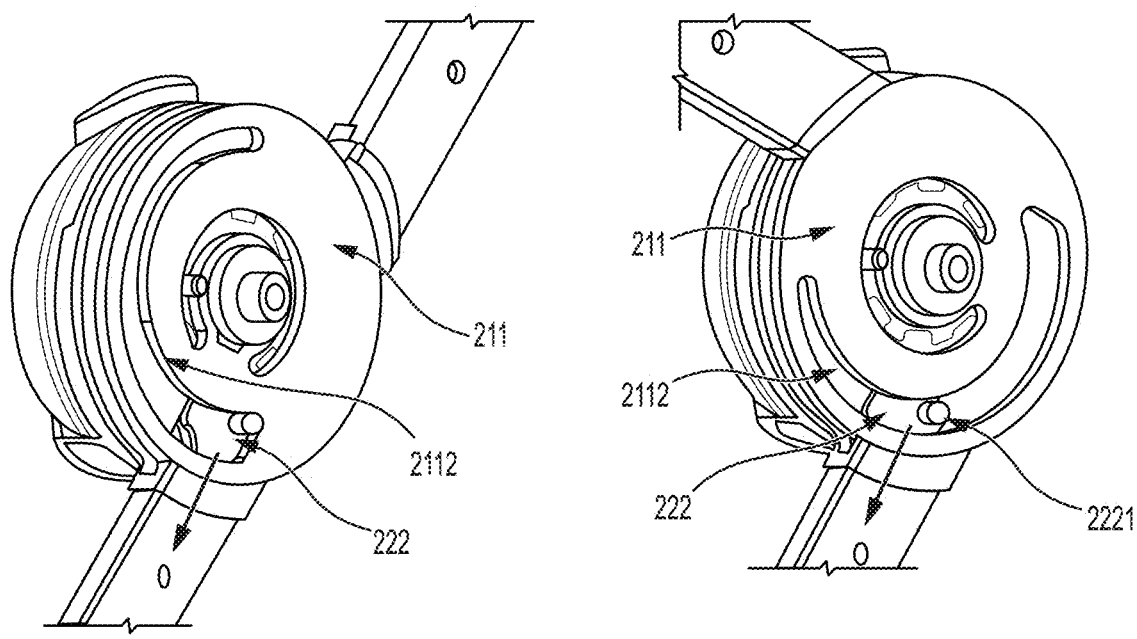
FIG. 8 is a partial view of the child seat frame of the compact collapsible stroller in different states of the present disclosure.
Figure 9:
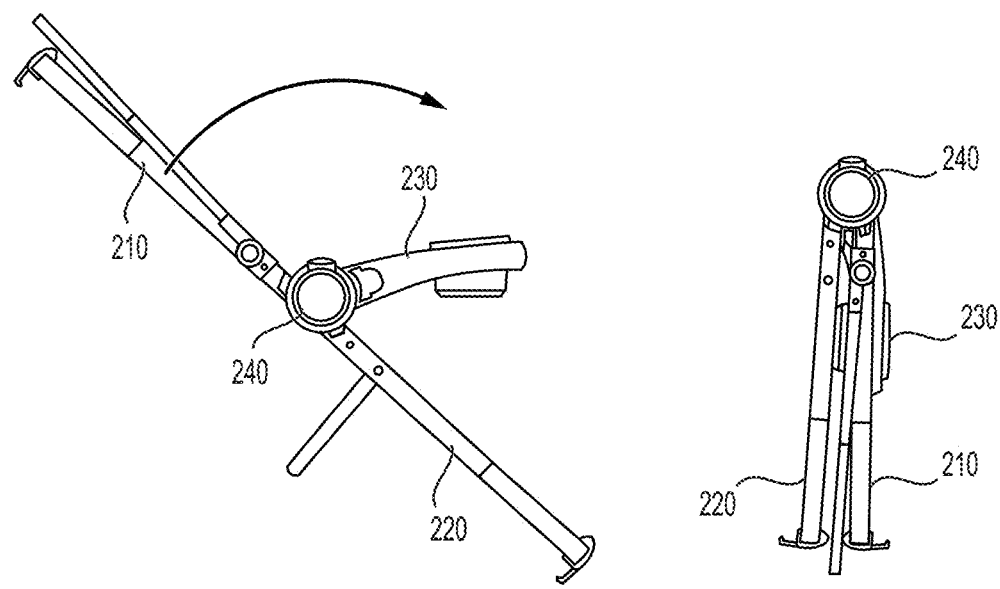
FIG. 9 is a side view of the child seat frame of the compact collapsible stroller in an unfolded and folded state of the present disclosure.

Referring to FIG. 6, in addition to the reclining handle 223, the child seat frame 20 also includes a fold handle 213 for folding the child seat frame 20 as a part of the folding of the stroller. The fold handle 213 retracts the spring-biased upper frame plunger 212 from its engagement position with the lower seat frame hub 221. The upper frame (i.e., upper seat frame) 210 can now rotate around the seat mount 240 relative to the lower frame (i.e., lower seat frame) 220. Referring to FIG. 7, when the upper frame 220 rotates, a ramped surface 2111 in the upper seat frame hub 211 acts on a ramped surface 251 on the latch pin assembly 250 to press the latch pin assembly 250 into the seat mount 240, and separate the latch pin assembly 250 from the child tray hub 231, thereby releasing the child tray 230 to be able to pivot freely around the seat mount 240. In addition, referring to FIG. 8, a spiral control surface 2112 located in the upper seat frame hub 211 disengages the two lower seat frame hubs 221 from the seat mount 240 because it acts on a lower frame plunger control post 2221. This allows the lower frame 220 to rotate around the seat mount 240 to a relatively vertical (upright) position with respect to the seat mount 240. The spiral control surface 2112 is formed to gradually move away from the center of the upper seat frame hub 211 from one side to the other, so that when the upper seat frame hub 211 rotates relative to the seat mount 240, the spiral control surface 2112 may abut against and push the lower frame plunger control post 2221 to move away from the seat mount 240. Referring to FIG. 9, this operation causes the upper frame 210, the lower frame 220 and the child tray 230 to fall parallel to one another and relatively vertical (upright) to the seat mount 240.

Figure 10:
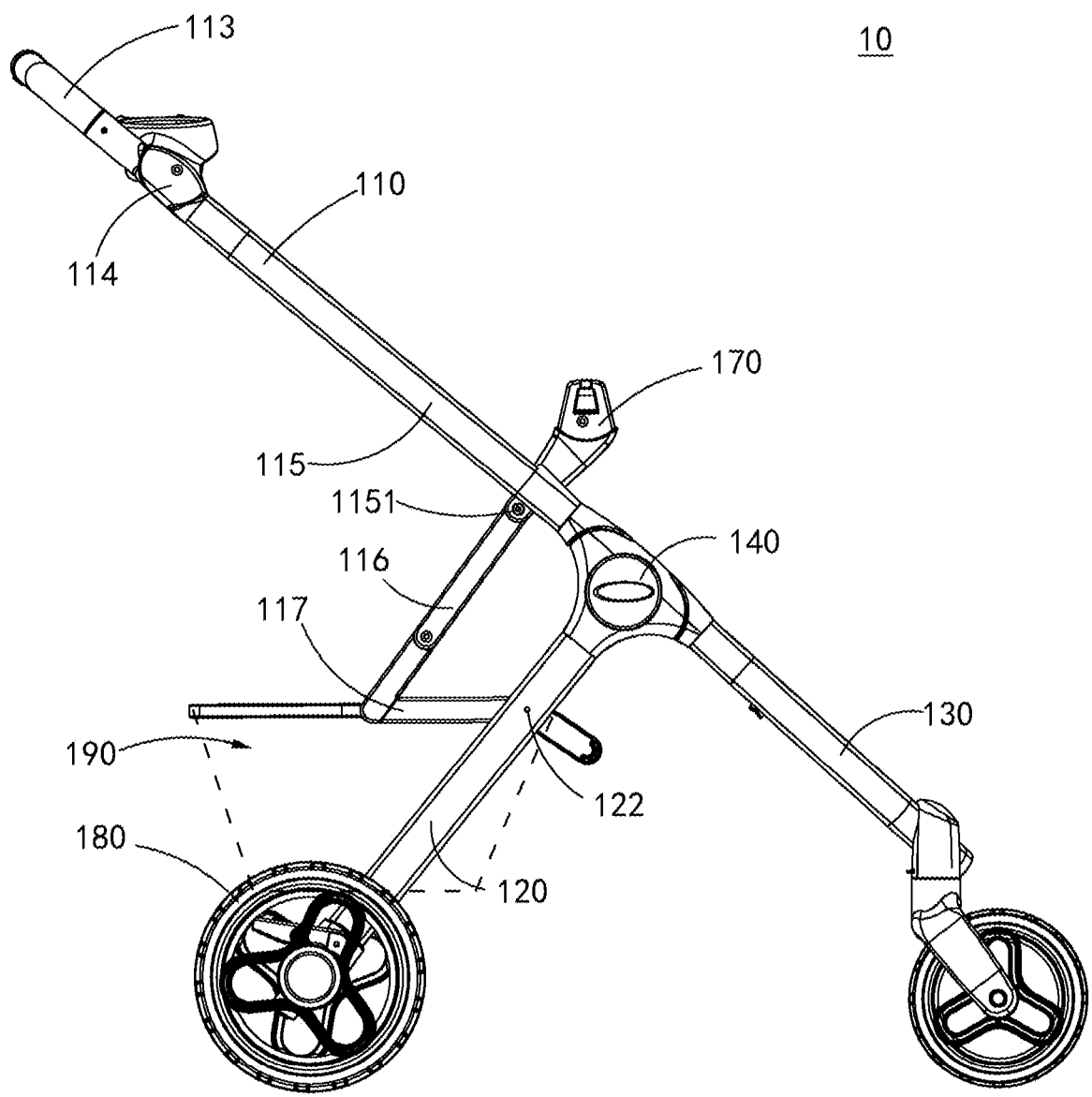
FIG. 10 is a side view of the main stroller frame of the compact collapsible stroller of the present disclosure.

Referring to FIG. 10, the stroller main frame 10 may include a handle portion 110, a rear leg portion 120 and a front leg portion 130. Each part of the stroller main frame 10 is pivotally connected to a central frame hub 140. An lower end of the rear leg portion 120 has rear wheels 180. An lower end of the front leg portion 130 has front wheels.

Figure 11:
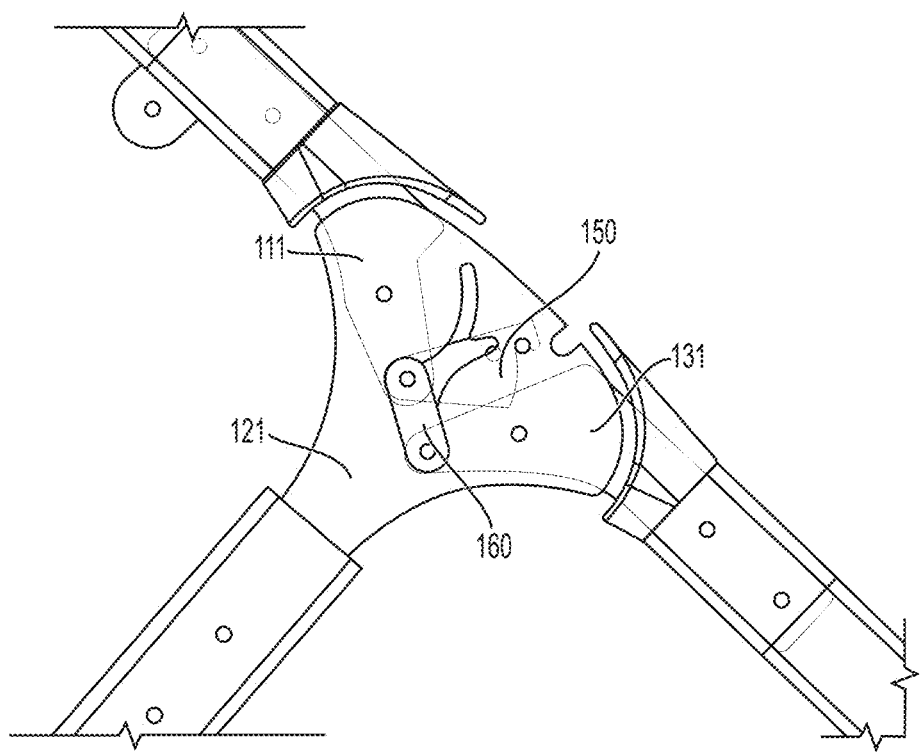
FIG. 11 is a partial view of the main stroller frame of the compact collapsible stroller of the present disclosure, in which one side of the internal structure is exposed.
Figure 11A:
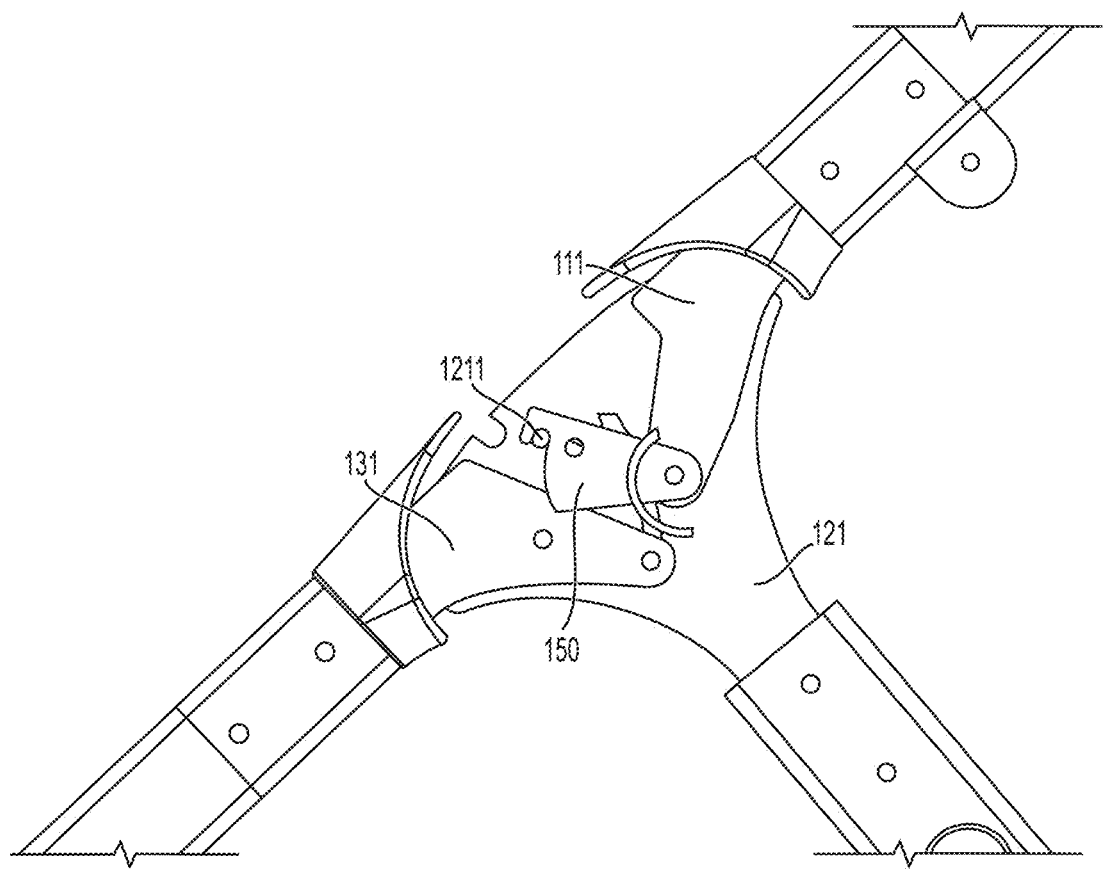
FIG. 11A is a partial view of the main stroller frame of the compact collapsible stroller of the present disclosure, in which the other side of the internal structure is exposed.
Figure 12:
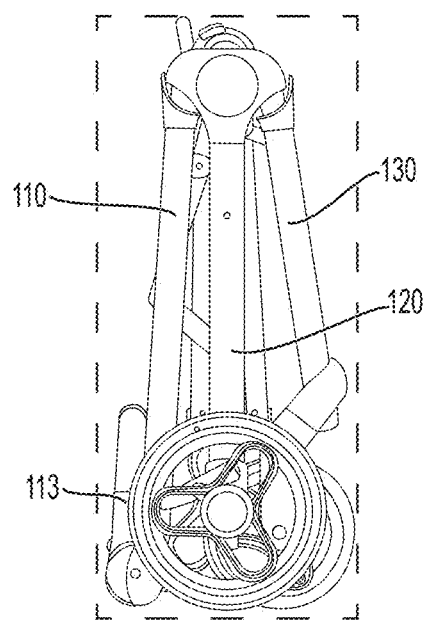
FIG. 12 is a view of the main stroller frame of the compact collapsible stroller in a folded state of the present disclosure.
Figure 13:
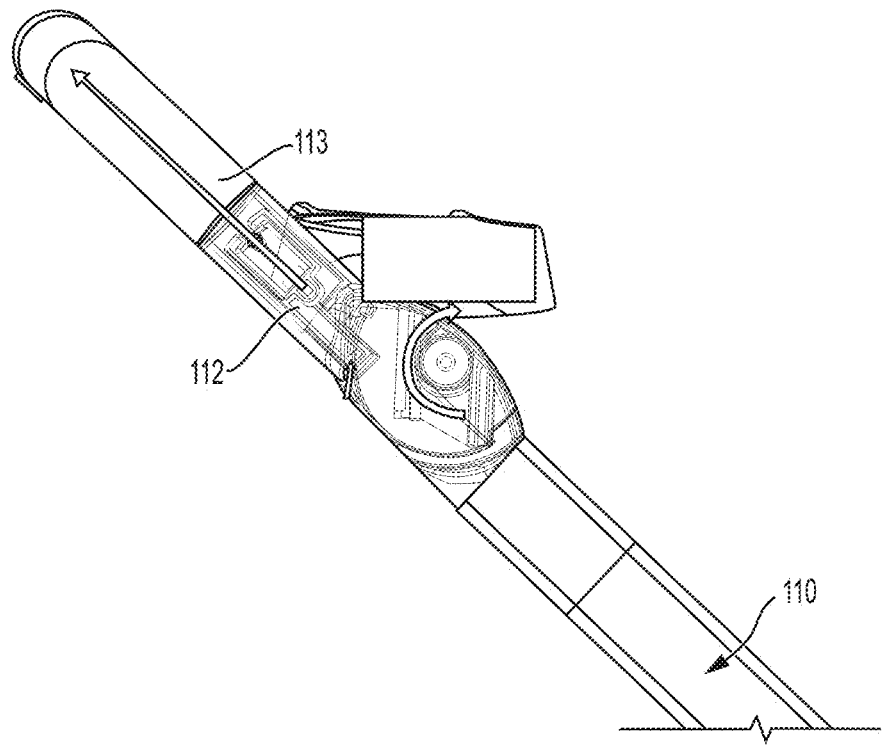
FIG. 13 is a schematic view showing a partial internal structure of the main stroller frame of the compact collapsible stroller of the present disclosure.

Referring to FIGS. 11 and 11A, a frame latch 150 pivotally connected to a handle part plate 111 engages with a locking pin 1211 on the rear leg part plate 121 such that the stroller 1 is locked in the opened position. When the frame latch 150 is rotated so that the latch surface passes through the lock pin 1211 and is disengaged from the lock pin 1211, the handle section plate 111 is allowed to rotate, and a front leg section plate 131 is pulled by a link 160 to the folded position. Referring to FIG. 12, the handle portion 110, the rear leg portion 120, and the front leg portion 130 are folded almost parallel to one another to obtain a compact folded size for easy transportation or storage of the main stroller frame 10 when the stroller is not in use. Referring to FIG. 13, the upper half of the handle portion 110 is locked by a spring biased plunger 112 and thus cannot be rotated, the spring biased plunger 112 is pulled to an unlocked state by a cable anchored in a main folding release housing. In this way, the upper handle portion 113 and the parent bracket (the part extending horizontally from the upper handle portion 113 as shown in FIG. 10) can be rotated in the folding process to obtain a more compact folding size. Referring to FIG. 12, the stroller 1 has a folding boundary (as shown by the dotted block in FIG. 12) in the folding process. When the stroller 1 is transformed between the unfolded state and the folded state, none of the parts can exceed beyond the folding boundary.

Referring to FIG. 13, the upper handle portion 113 is pivotally fixed to the handle portion hub 114. The spring biased plunger 112 is engaged with the handle portion hub 114 so that the upper handle portion 113 cannot pivot relative to the handle portion hub 114. The spring biased plunger 112 can be actuated via a cable to disengage from the handle portion hub 114 so that the upper handle portion 113 can pivot relative to the handle portion hub 114.

Figure 14:
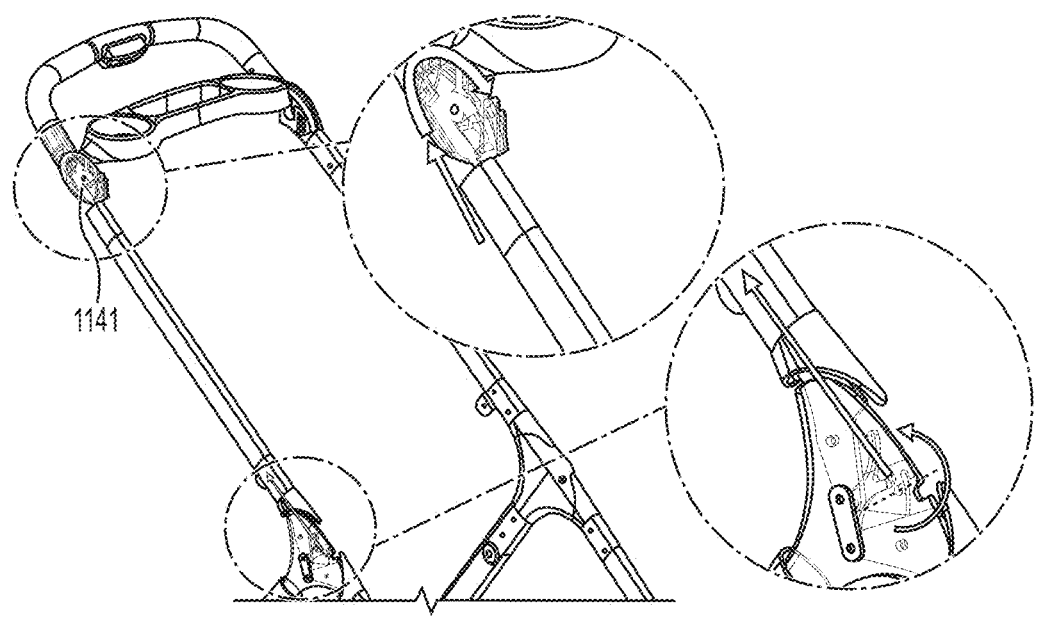
FIG. 14 is a partial schematic view showing the main stroller frame of the compact collapsible stroller of the present disclosure, in which a part of the area is enlarged to show its structure more clearly.
Figure 15:
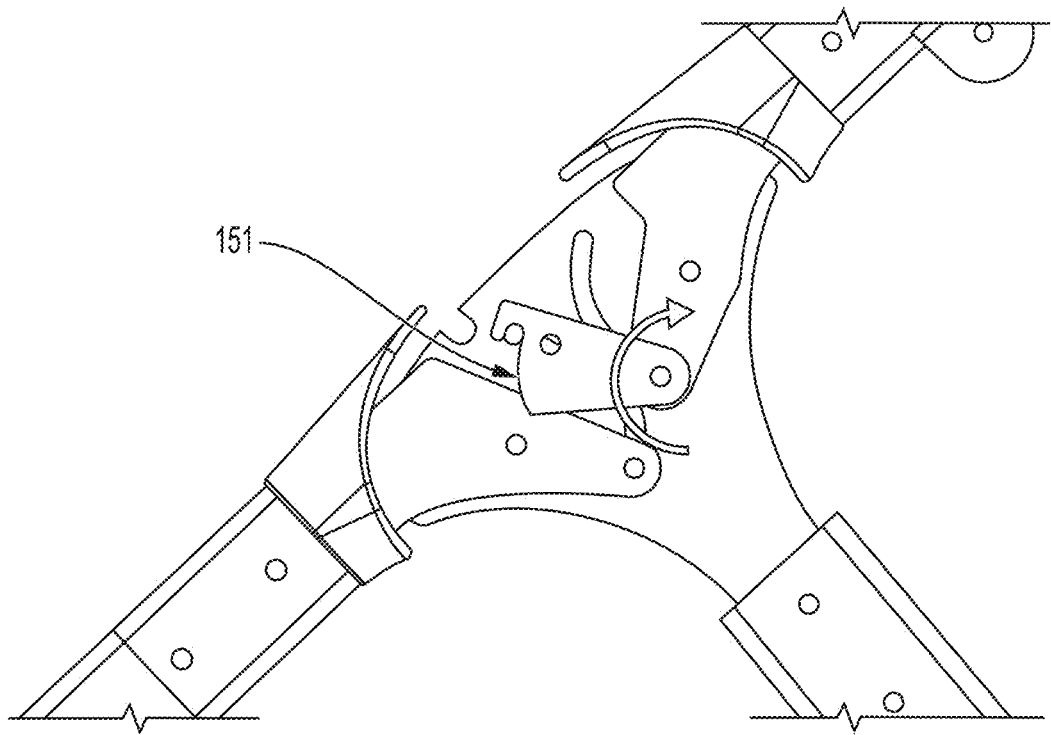
FIG. 15 is a partial view of the main stroller frame of the compact collapsible stroller of the present disclosure, in which one side of the internal structure is exposed.

Referring to FIG. 14, the cable anchored on a circular barrel 1141 in the handle portion hub 114 and attached to the frame latch 150 rotates with the upper handle portion 113, to actuate the frame latch 150 (an arrow in FIG. 15 shows a direction in which the frame latch 150 is actuated) and pivot it past the locking pin, and thus fold the handle portion 110 toward the closed position. Time for folding is controlled by an extended latch surface 151 of the frame latch 150. The extended latch surface 151 allows the frame latch 150 to engage with the locking pin 1211 until the upper handle portion 113 has rotated by a larger distance from its original position. When the extended latch surface 151 is disengaged from the locking pin 1211, the handle portion 110 may be folded toward the closed position. This results in a more natural folding movement while preventing the main stroller frame 10 from being accidentally folded (as shown in FIG. 15). When the upper handle portion 113 rotates toward the opened position, an anchor end of the cable rotates backward (counterclockwisely as shown in FIG. 13) along with the upper handle portion 113, and the length from the cable to the frame latch 150 increases, which allows the frame latch 150 to re-engage with the locking pin 1211.

Figure 16:
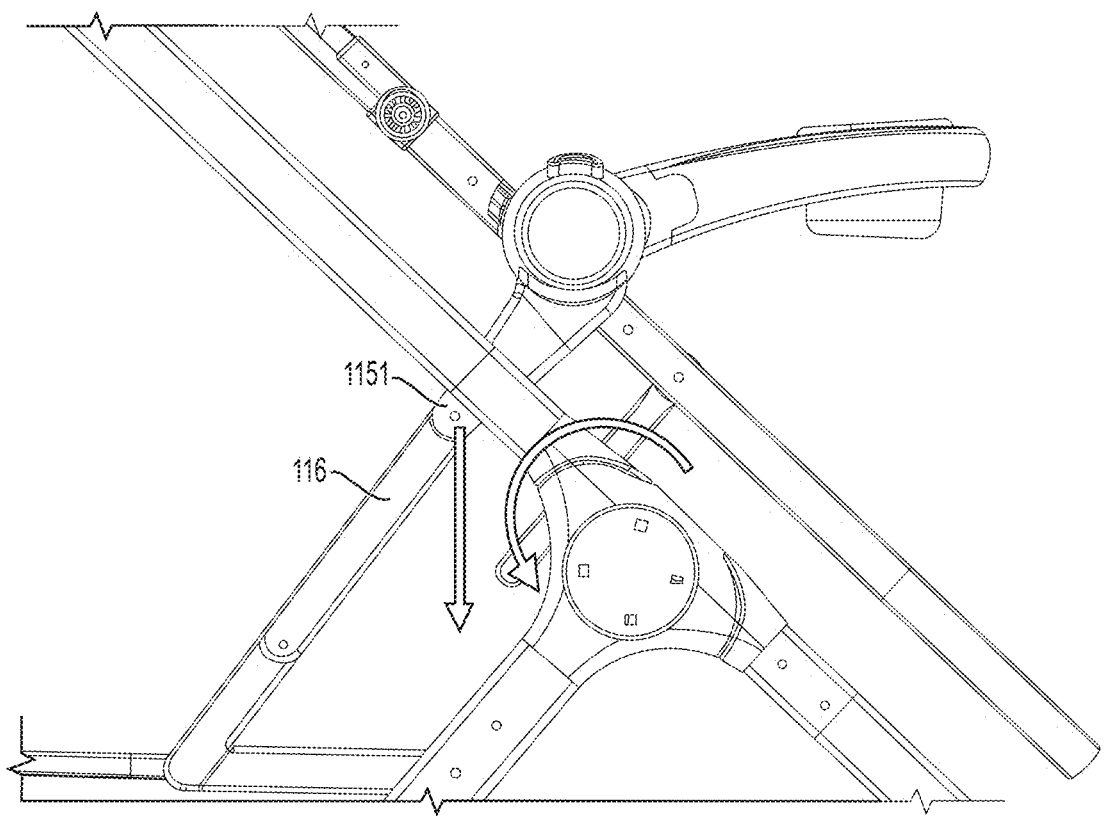
FIG. 16 is a partial side view of the compact collapsible stroller of the present disclosure.
Figure 16A:
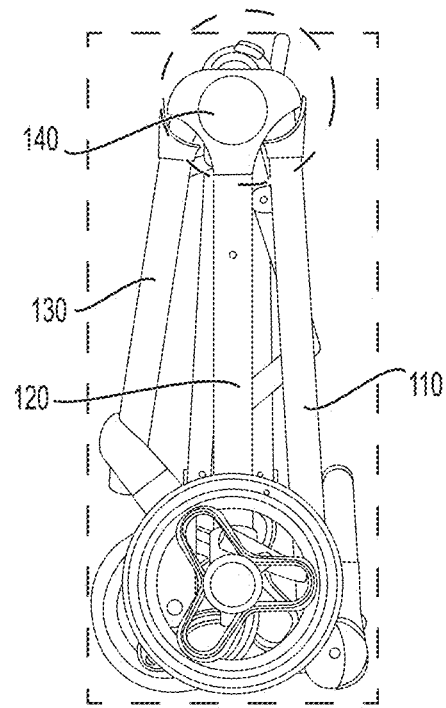
FIG. 16A is a side view of the compact collapsible stroller in a folded state of the present disclosure.
Figure 17:
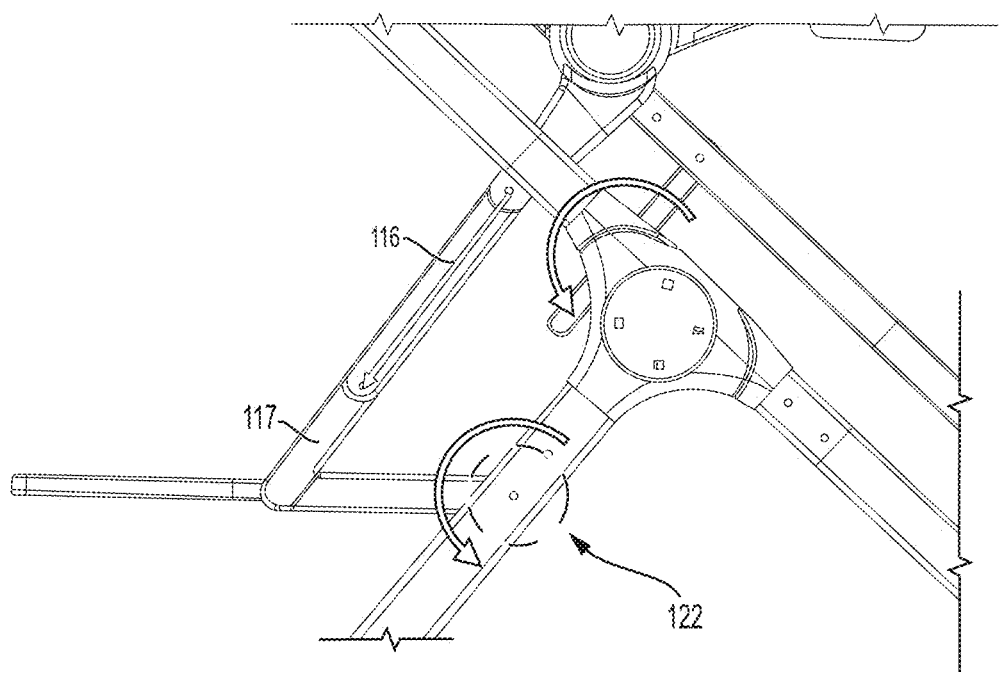
FIG. 17 is a partial side view of the compact collapsible stroller of the present disclosure.
Figure 17A:
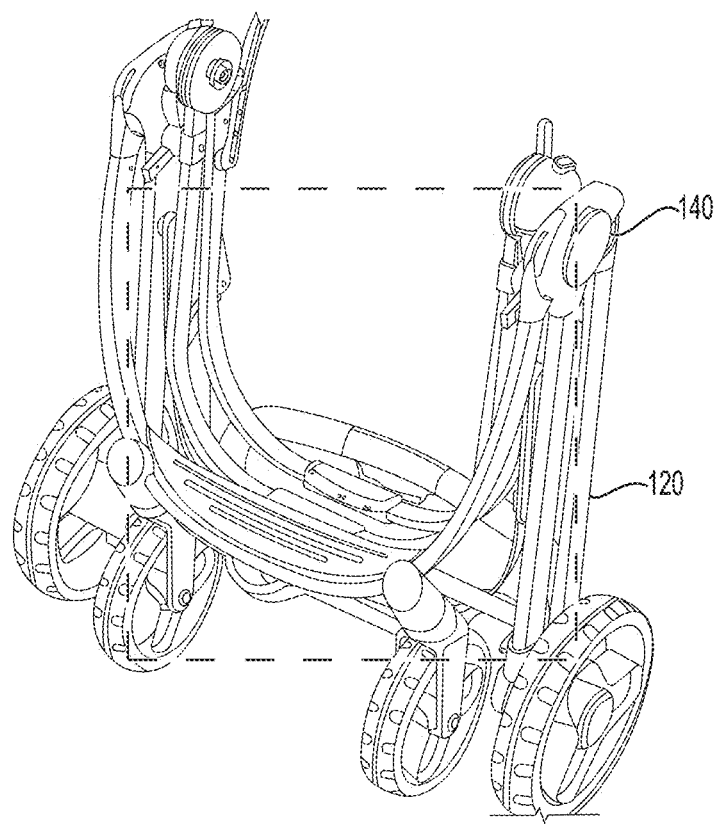
FIG. 17A is a perspective view of the compact collapsible stroller in a folded state of the present disclosure.
Figure 18:
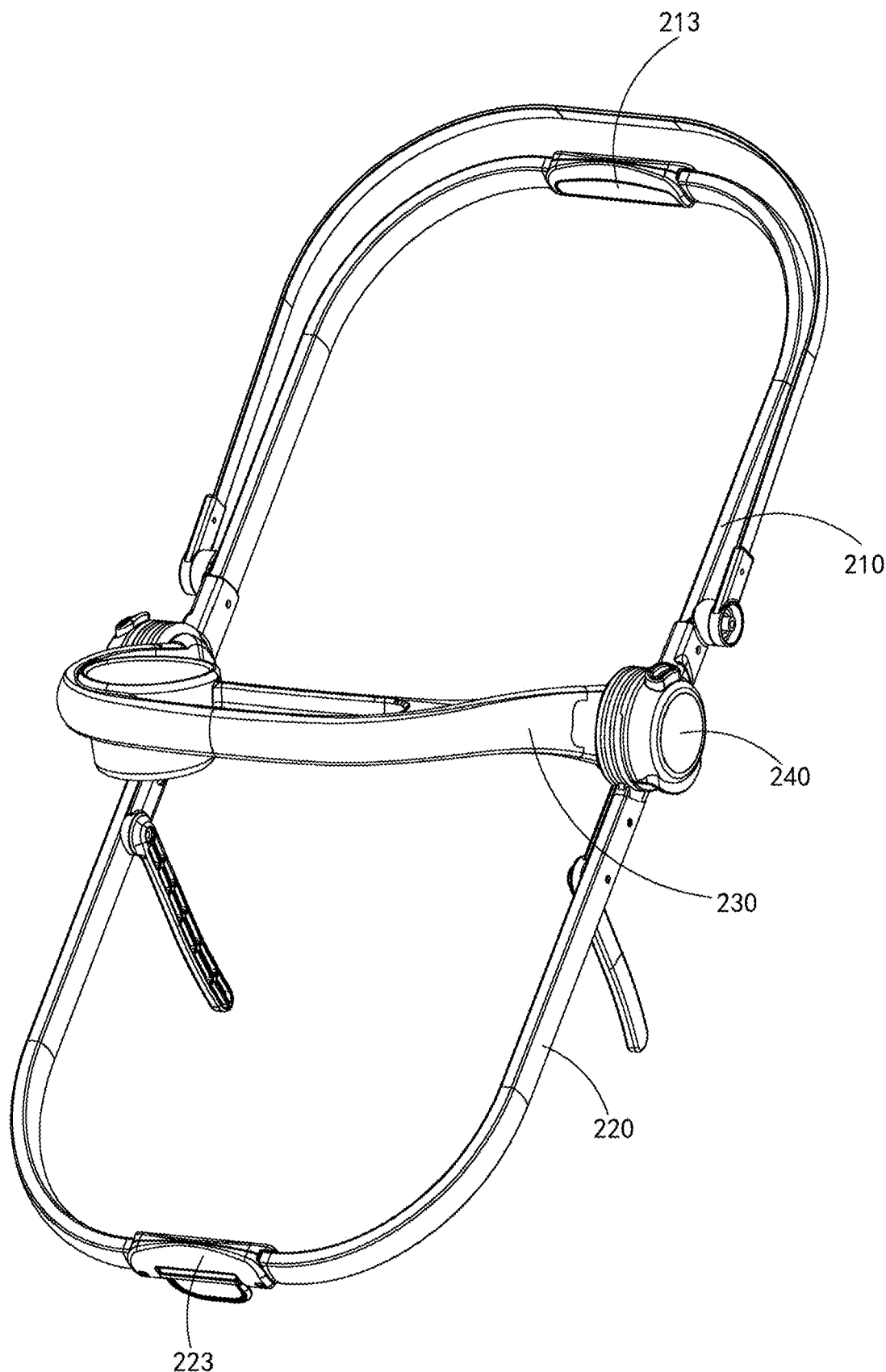
FIG. 18 is a perspective view of the child seat frame of the compact collapsible stroller of the present disclosure.
Figure 19:
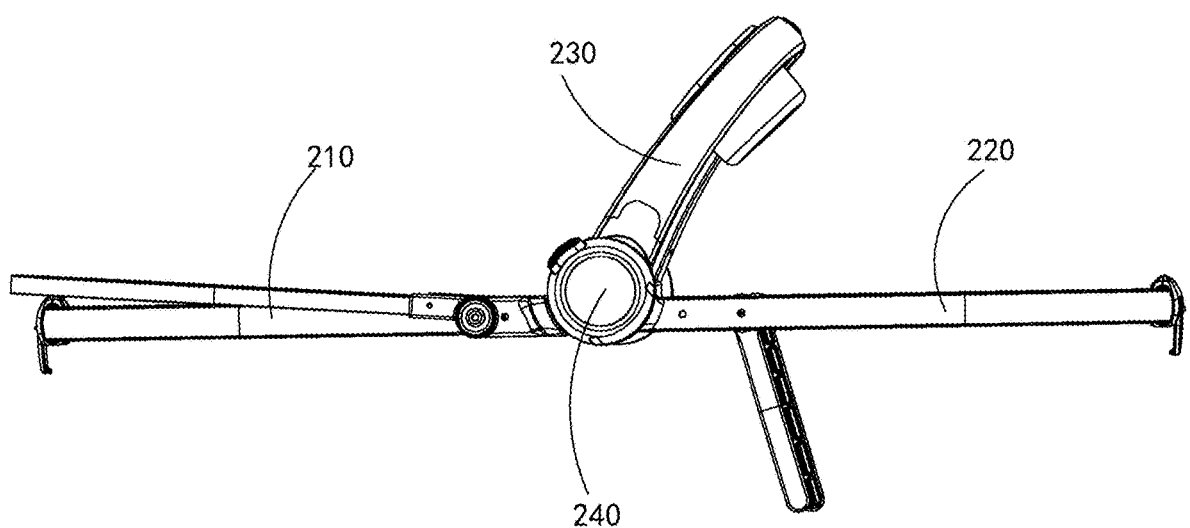
FIG. 19 is a side view of the child seat frame of the compact collapsible stroller of the present disclosure.
Figure 20:
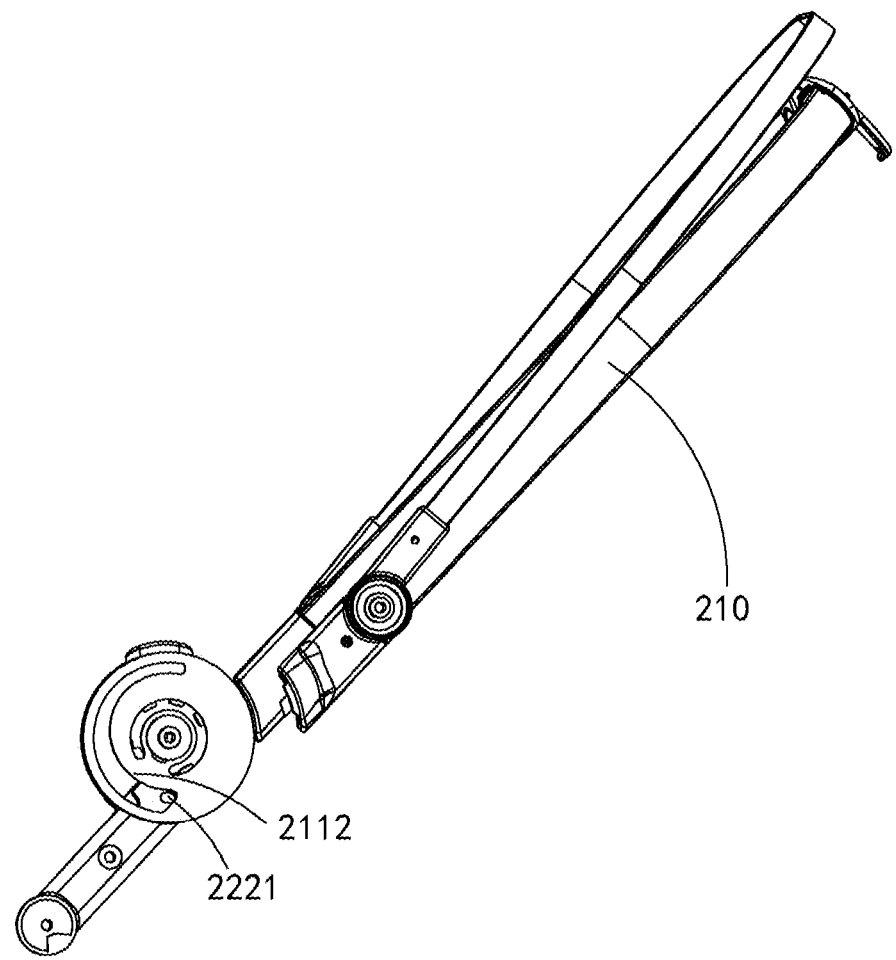
FIG. 20 is a side view of some parts of the child seat frame of the compact collapsible stroller of the present disclosure.
Figure 20:
Figure 21:
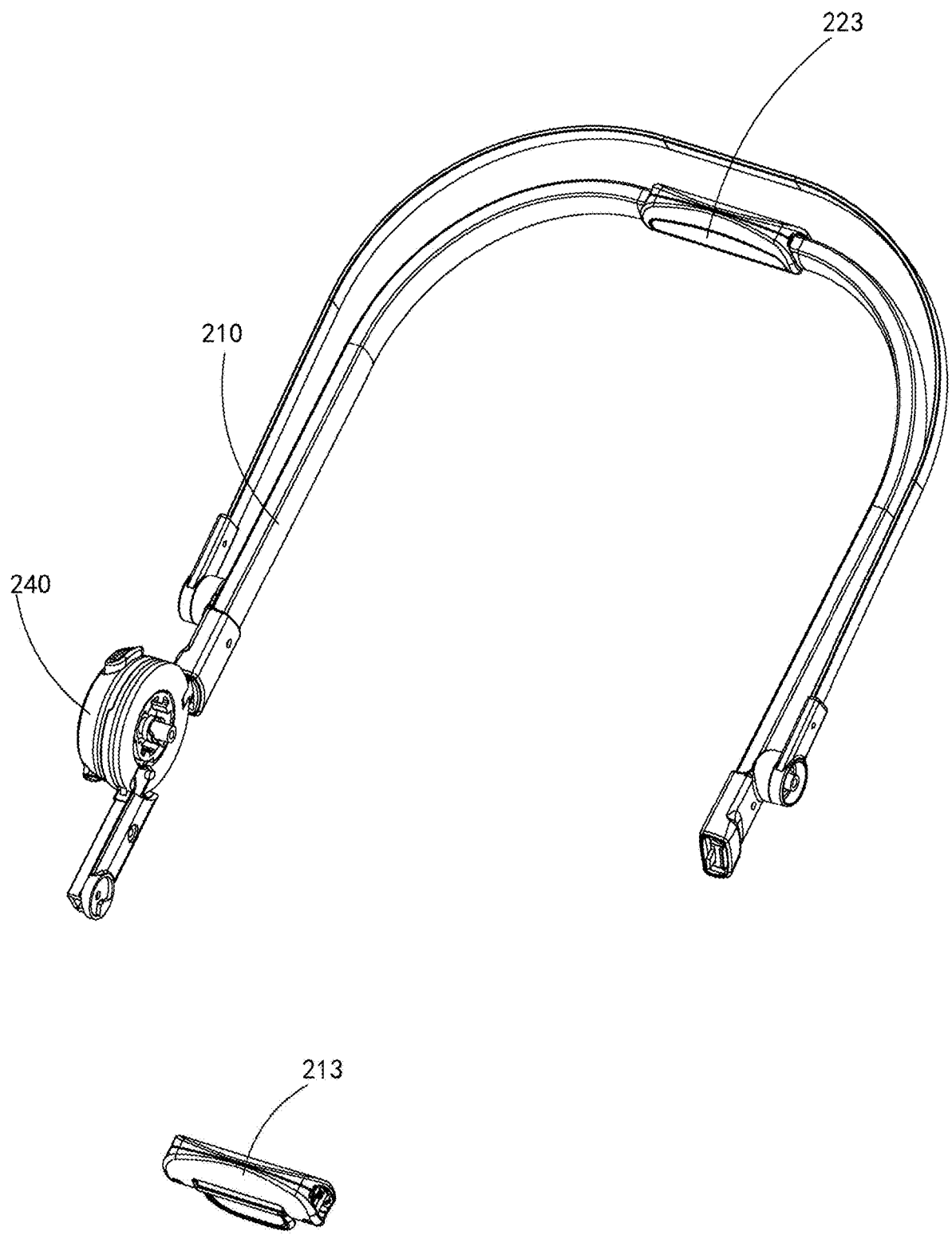
FIG. 21 is a perspective view of some parts of the child seat frame of the compact collapsible stroller of the present disclosure.
Figure 22:
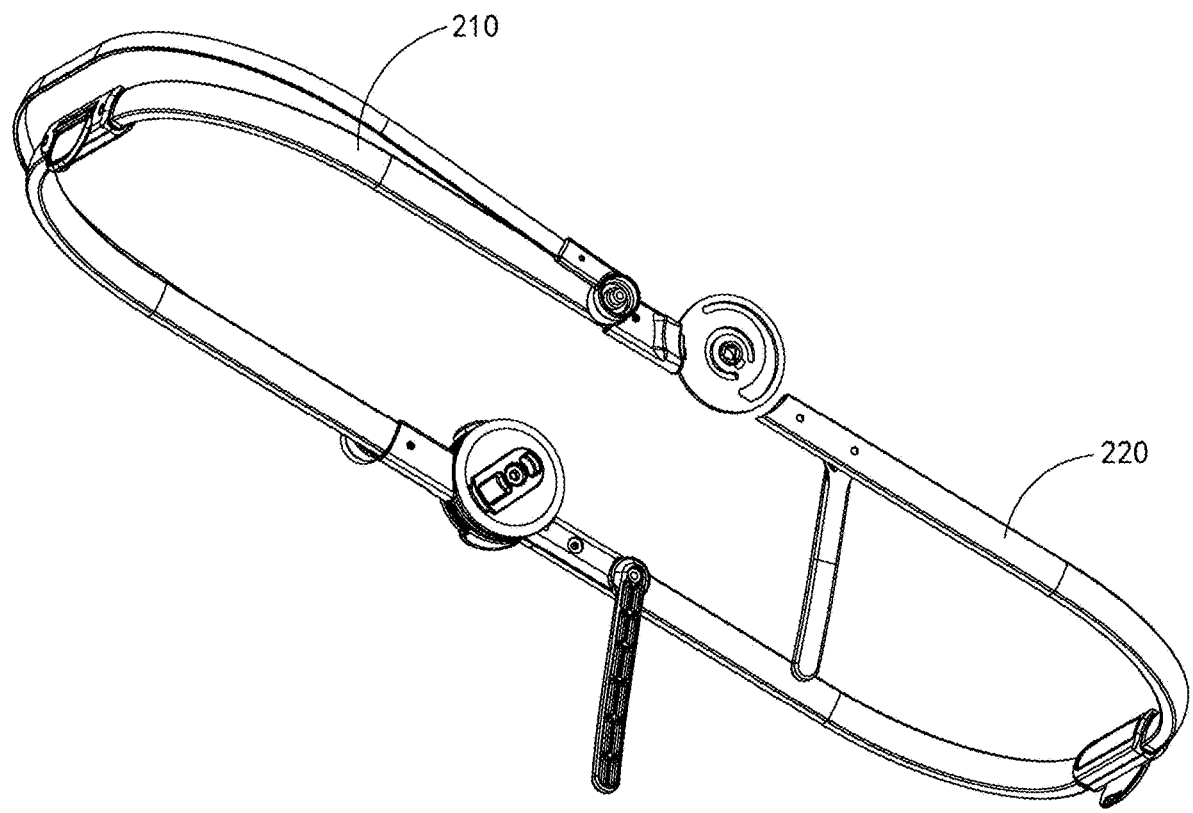
FIG. 22 is a perspective view of some parts of the child seat frame of the compact collapsible stroller of the present disclosure.
Figure 23:
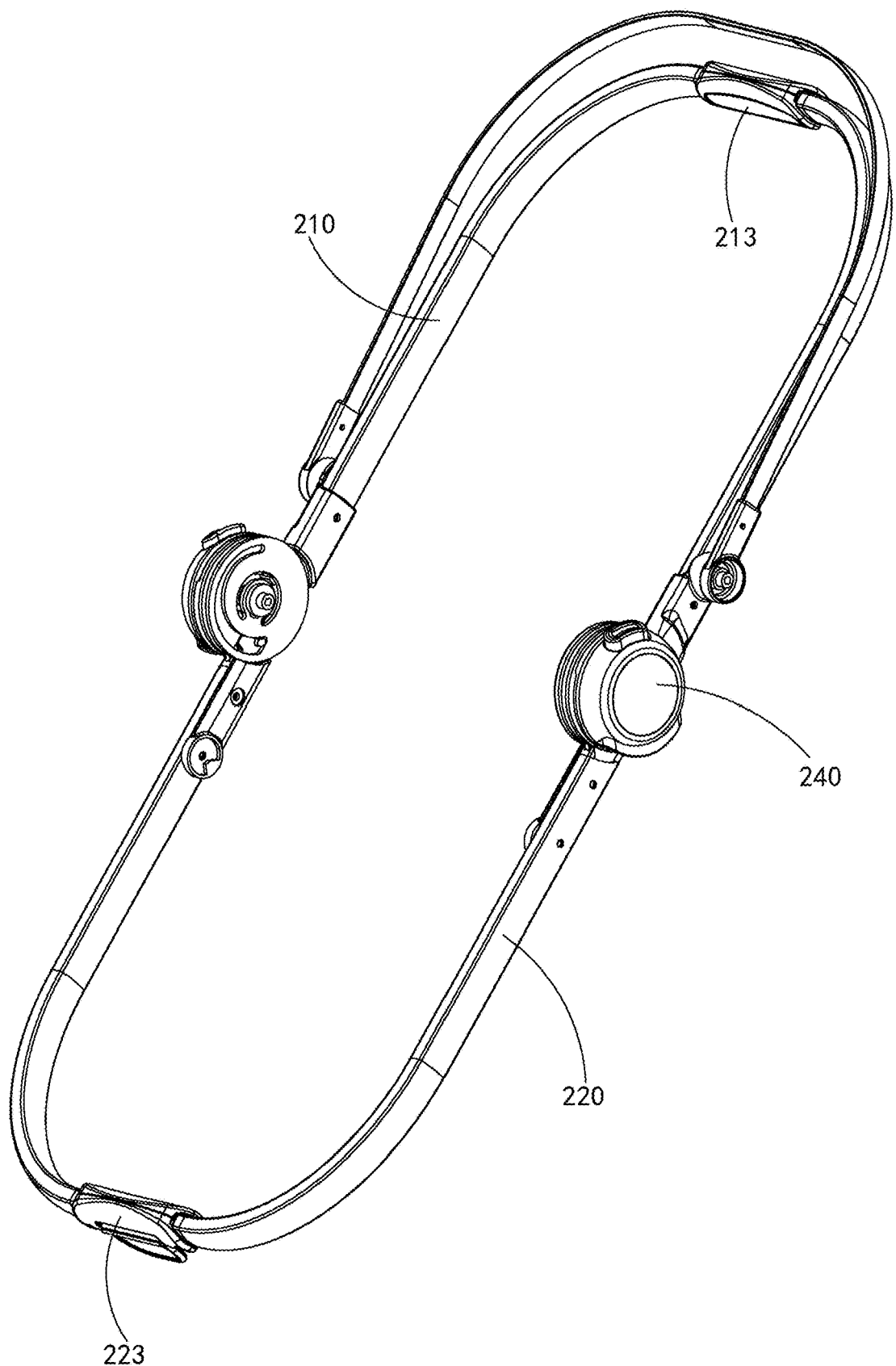
FIG. 23 is a perspective view of some parts of the child seat frame of the compact collapsible stroller of the present disclosure.
Figure 24:
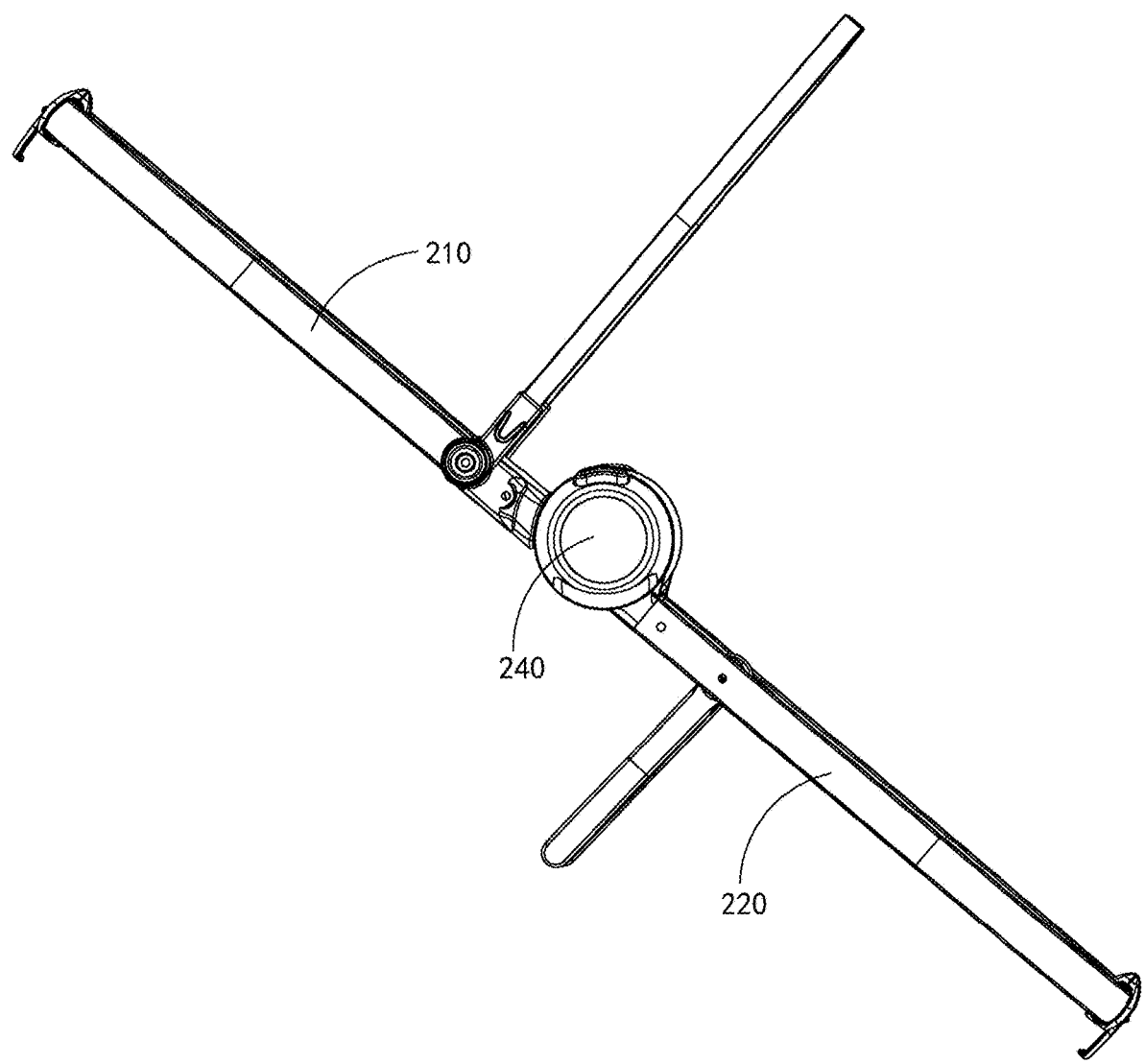
FIG. 24 is a side view of the child seat frame of the compact collapsible stroller of the present disclosure.

Referring to FIGS. 16 and 16A, the rotation of the lower handle portion 115 also drives a series of couplings between the seat mount 240 and the stroller basket for carrying the baby. An upper link 116 is directly attached to the seat frame hub (seat mount) 240 and is connected to the handle portion 110 at a pivot point 1151. An upper end of the upper link 116 is formed with an adapter portion 170 (see FIG. 10). Due to the downward folding movement of the handle portion 110, the upper link 116 is driven downward and the child seat hub (seat mount) 240 is pulled within a predetermined folding boundary. Referring to FIGS. 17 and 17A, a basket frame is attached between a lower link 117 and a pivot point on the rear leg portion 120. A carrying basket 190 may be provided below a basket frame (a left part of the lower link 117 as shown in FIG. 10). During the folding of the main stroller frame 10, only the carrying basket 190 is linked to the main stroller frame 10 to be folded, while the adapter portion 170 is not linked. Through the downward folding movement (pivoting movement) of the handle portion 110, the upper link 116 drives the lower link 117 in a downward movement, and further drives the basket frame downward and rotates it behind the rear leg portion 120. This allows the basket frame to be installed within the folding boundary while maximizing its size so as to achieve maximum storage capacity.

When the stroller 1 is transformed from the unfolded state (shown in FIGS. 16 and 17) to the folded state (shown in FIGS. 16A and 17A), the seat mount 240 gradually approaches the central frame hub 140, and finally overlaps or at least substantially overlaps in a transverse direction (perpendicular to the paper surface of FIG. 16A). At this time, the handle portion 110, the rear leg portion 120, and the front leg portion 130 vertically extend substantially downward from the central frame hub 140, and the upper frame 210, the lower frame 220, and the child tray 230 vertically extend substantially downward from the seat mount 240, so that the stroller 1 in the folded state occupies the minimum space.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

Although the present disclosure has been described with reference to the exemplary embodiments, the terms used are illustrative and exemplary rather than restrictive. Since the present disclosure can be implemented in various forms without departing from the spirit and essence of the present disclosure, it should be understood that the foregoing embodiments are not limited to any of the foregoing details, but should be interpreted in the broadest sense within the scope defined by the claims. Therefore, all changes falling within the scope of the claims or their equivalents shall be covered by the claims.

The invention claimed is:

1. A compact collapsible stroller, comprising:
a main stroller frame including an adapter portion, a central frame hub, a handle portion, a rear leg portion, and a front leg portion, the handle portion and the front leg portion pivotally coupled to the central frame hub, the adapter portion being mounted to the handle portion, wherein the stroller has an unfolded state for use and a folded state for storage and wherein the adapter portion approaches rear wheels when the stroller is transformed from the unfolded state to the folded state, wherein the handle portion comprises a lower handle portion pivotally coupled to the central frame hub;
a handle portion hub formed at an end of the lower handle portion opposite to the central frame hub; and
an upper handle portion pivotally coupled to the handle portion hub so that rotation of the upper handle portion disengages the lower handle portion from the central frame hub so that the lower handle portion is rotated relative to the central frame hub causing a seat mount to approach the central frame hub.

2. The stroller of claim 1, wherein in the folded state, the central frame hub and the seat mount overlap in a lateral direction.

3. The stroller of claim 1, wherein in the folded state, each of the handle portion, the rear leg portion, and the front leg portion substantially vertically extends downward from the central frame hub, and each of an upper frame, a lower frame and a child tray substantially vertically extends downward from the seat mount.

4. The stroller of claim 1, wherein the main stroller frame further includes a carrying basket extending backward from the rear leg portion, the carrying basket rotating and simultaneously moving close to the rear leg portion when the stroller is transformed from the unfolded state to the folded state.

5. The stroller of claim 4, wherein the main stroller frame further includes an upper link attached to the adapter portion and pivotally connected to the handle portion and a lower link pivotally connected to the rear leg portion and the upper link.

6. The stroller of claim 1, further comprising:
a seat frame adapted to be coupled to the seat mount,
in a selected one of a seating position in which an upper part of the seat frame extends upward and a lower part of the seat frame extends downward and a cradle position in which the upper and lower parts of the seat frame extend horizontally.

7. The stroller of claim 6, wherein, in the seating position, the upper part of the seat frame extends obliquely upward and rearward from the lower part of the seat frame.

8. The stroller of claim 6, further comprising a reclining handle coupled to the seat frame via a first actuation cable so that actuation of the reclining handle unlocks the upper and lower parts of the seat frame to rotate as a unit between the seating and cradle positions.

9. The stroller of claim 8, wherein the reclining handle is mounted on the seat frame.

10. The stroller of claim 6, further comprising:
a fold handle coupled to the seat frame via a second actuation cable so that actuation of the fold handle unlocks at least one of the upper and lower parts of the seat frame for rotation relative to the other of the upper and lower parts of the seat frame so that the seat frame can be folded to facilitate folding of the main stroller frame.

11. The stroller of claim 10, further comprising:
a tray coupled to the seat frame via a tray hub, the tray hub being configured to unlock the tray upon actuation of the fold handle so that the tray can rotate relative to at least one of the upper and lower parts of the seat frame.

12. The stroller of claim 6, wherein the adapter portion is configured to releasably mount the seat frame thereon, the adapter portion being coupled to the main stroller frame via a linkage including a first member rotatably coupled to the handle portion and a second member rotatably coupled to the first member and the rear leg portion.

13. The stroller of claim 12, wherein the first and second members are configured so that, when the main stroller frame is folded the adapter is pulled into a predetermined folding boundary of the main stroller frame.

14. The stroller of claim 13, wherein the linkage is configured so that, when the main stroller frame is folded, the seat frame is located adjacent to the central frame hub.

15. A compact collapsible stroller, comprising:
a main stroller frame including an adapter portion, a central frame hub, a handle portion, a rear leg portion, and a front leg portion, the handle portion and the front leg portion pivotally coupled to the central frame hub, the adapter portion being mounted to the handle portion, wherein the stroller has an unfolded state for use and a folded state for storage and wherein the adapter portion approaches rear wheels when the stroller is transformed from the unfolded state to the folded state, wherein the main stroller frame further includes a carrying basket extending backward from the rear leg portion, the carrying basket rotating and simultaneously moving close to the rear leg portion when the stroller is transformed from the unfolded state to the folded state, and wherein the main stroller frame further includes an upper link attached to the adapter portion and pivotally connected to the handle portion and a lower link pivotally connected to the rear leg portion and the upper link; and
a basket frame attached between the lower link and a pivot point on the rear leg portion.

16. The stroller of claim 15, wherein when transforming from the unfolded state to the folded state, through a downward pivoting movement of the handle portion, the upper link drives the lower link in the downward movement, thereby driving the basket frame attached to the lower link to rotate corresponding to the pivot point on the rear leg portion.

* * * * *